March 14, 1967
W. P. KELLEY ETAL
3,309,153
SNUBBER BEARING ASSEMBLY
Filed Dec. 26, 1963
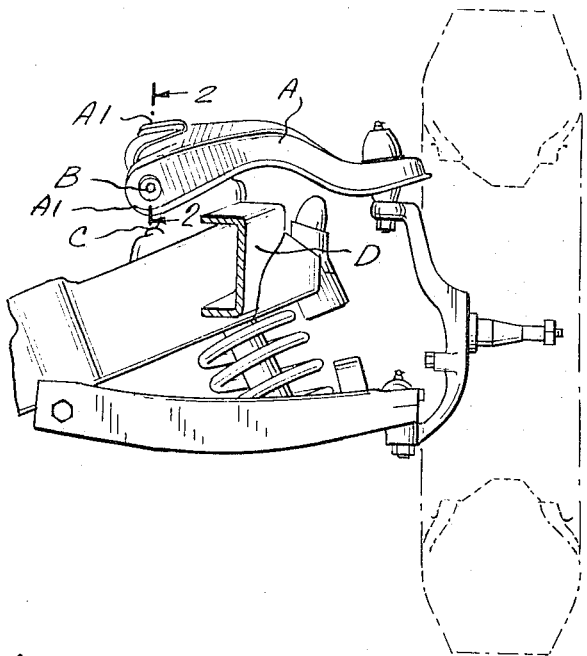
Fig. 1.
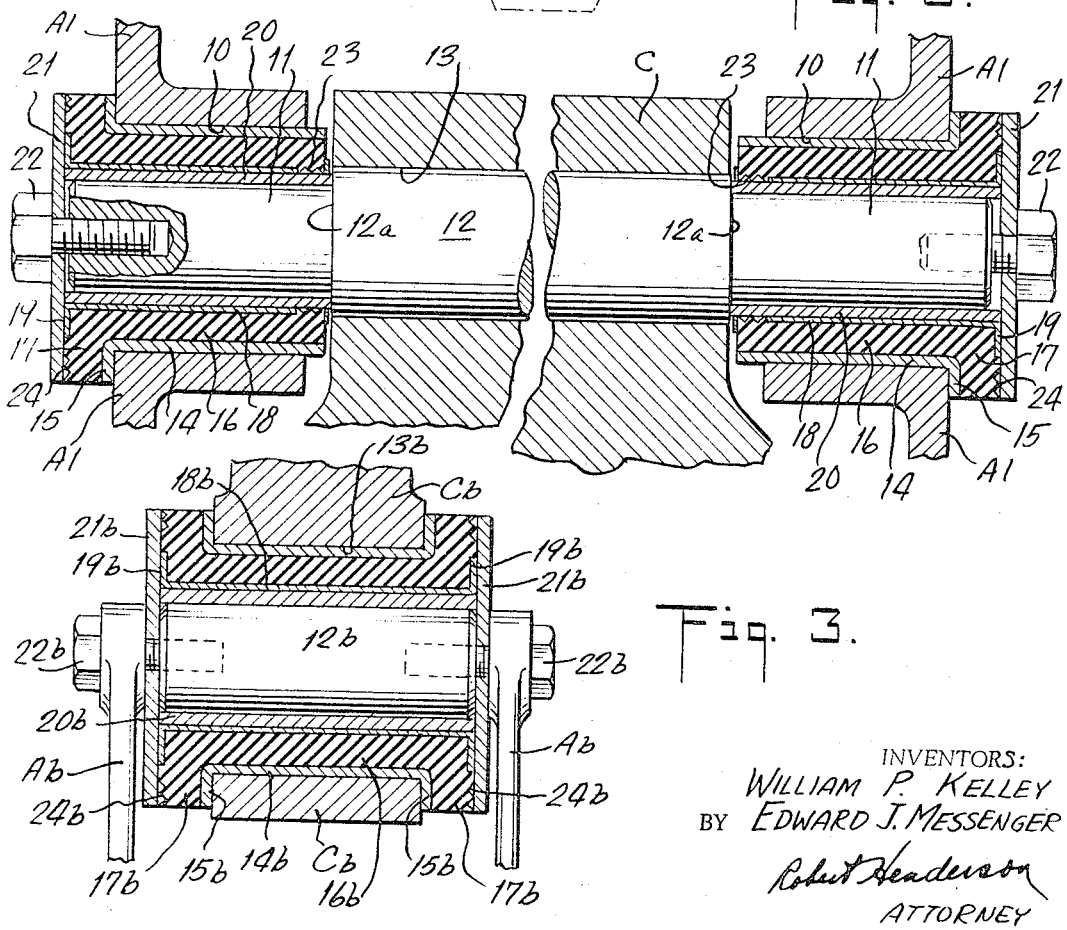
Fig. 2.
Fig. 3.
INVENTORS:
WILLIAM P. KELLEY
BY EDWARD J. MESSENGER
Robert Henderson
ATTORNEY

United States Patent Office 3,309,153
Patented Mar. 14, 1967

3,309,153
SNUBBER BEARING ASSEMBLY
William P. Kelley, Penfield, and Edward J. Messenger, Fairport, N.Y., assignors to Garlock Inc., Palmyra, N.Y., a corporation of New York
Filed Dec. 26, 1963, Ser. No. 333,307
4 Claims. (Cl. 308—36.1)

This invention relates to bearing assemblies which are adapted to carry a rockable or rotary element and to snub or partially absorb shocks to which the assembly is subjected transversely and/or longitudinally of the bearing's axis.

One important use for snubber bearing assemblies is in automobile suspensions wherein a rockable element pivots to a limited extent with reference to another element, usually some part of the chassis of the automobile. Such bearings are subject to substantial shocks from road irregularities, the effects of which should, of course, be minimized. They, also, are subject to substantial impairment from dirt and moisture conditions and require lubrication or arrangements which obviate the need for lubrication.

The problem has been attacked by providing a rubber bushing in the bearing to give a shock-snubbing effect. Also, as angular movement of the rockable element is usually no more than 30° from a mean position, such rubber bushings have been provided of such thickness and pliability that, with the inner and outer cylindrical surfaces firmly bonded to the two relatively rockable elements, the latter are relatively free to rock while the rubber in the bushing becomes distorted about the latter's axis to the extent of the rocking effect.

Such an arrangement eliminates sliding engagement of the two relatively rockable elements and, consequently, obviates the need for lubrication between said elements. It, also, prevents dirt or moisture from finding its way into the bearing.

The just-mentioned arrangement, however, suffers a very serious drawback in that the mentioned distortion or twisting of the rubber bushing, something occurring continuously and with great rapidity during operation of the automobile, causes rapid breakdown of the rubber, consequently making frequent replacement of the bearing necessary. Also, in the just-mentioned prior arrangement, the rubber responds differently, under different temperature conditions, with respect to such distortion; hence, the bearing does not function equally well at all temperatures to which the automobile may be subjected in use.

An important object of this invention is the provision of an improved bearing assembly capable of snubbing shock to which related rotary and/or rockable elements are subjected.

Another important object is the provision of such a bearing employing an elastomer bushing which is not subjected to material twisting or torque-caused distortion, thereby substantially lengthening the useful life of the bearing.

Another important object is the provision of such a bearing which is well protected against entry of dirt or moisture thereinto.

Another important object is the provision of such a bearing which may be so constituted as to need little or no lubrication.

Another important object is the provision of such a bearing employing an elastomer bushing for shock-snubbing purposes wherein the bushing offers no material impediment to the relative angular movement of the two relatively rockable or rotatable elements.

Another important object is the provision of such a bearing which is unitary so that it may be installed or replaced quickly as a unit without danger of improper positioning of its components or of damaging the bearing assembly or any of its parts during installation.

Another important object is the provision of such a bearing wherein an elastomer bushing therein is adapted to snub not only shocks directed laterally thereto but also axial or thrust shocks to which the bearing may be subjected.

According to the forms of this invention illustrated herein, an elastomer bushing is employed, but instead of both cylindrical surfaces thereof being bonded to the adjacent cylindrical surfaces of the two relatively rockable or rotatable elements, at least one of said bushing's cylindrical surfaces is not so bonded to the adjacent surface of one of said elements but is covered with a cylindrical sleeve preferably of a self-lubricating bearing material. This sleeve, advantageously, may be bonded to the bushing and may be of a self-lubricating plastic material such as, e.g., polytetrafluoroethylene.

In the accompanying drawing:

FIGURE 1 is a perspective view of a suspension assembly at a front end of an automobile, in which a bearing, according to this invention, may be advantageously employed.

FIG. 2 is a central axial sectional view of a preferred form of bearing assembly according to this invention; it being assumed that this bearing is employed in the suspension assembly of FIG. 1, and the section being substantially on the line 2—2 of the latter figure.

FIG. 3 is a central axial sectional view of a modified form of bearing assembly according to this invention.

Those familiar with front end suspensions of the general character shown in FIG. 1 will understand that, during operation of the automobile on a roadway, the arm A pivots in a generally vertical plane with a more or less vibratory action about an axis, at B at the line 2—2, where said arm is pivotally connected to a bracket C which is rigidly associated with a chassis frame member D of the automobile. It is at the axis B that a bearing, according to this invention, is located.

The bearing, as illustrated in FIG. 2, is operative as a pivot connection between a pair of ears A1 at the bifurcated inner end of the arm A and an upper portion of the bracket C. The bearing is duplicated in the two ears A1, a bearing being provided within a bore 10 in each ear and mounted upon the reduced end 11 of a pivot pin 12, the central portion of which extends within a bore 13 in the bracket C, preferably being tightly fitted against rotation within said bore.

Each of the similar bearings, as illustrated, comprises a rigid, cylindrical outer metal shell member 14 formed with a radially outwardly extending flange 15 at its outer end, an elastomer snubbing sleeve member 16 extending intimately within said shell member and formed with a radially outwardly extending flange 17 intimately overlying the shell's flange 15, a lining or bearing sleeve member 18 of suitable, preferably self-lubricating, bearing material extending intimately within said snubbing sleeve and formed with a radially outwardly extending flange 19 intimately overlying the flange 17 of the snubbing sleeve, and a steel inner, cylindrical, shaft sleeve 20.

Each bearing assembly further includes a rigid, centrally apertured, circular end plate 21 which bears against the outer ends of shaft sleeve 20 and the snubbing and lining members 16 and 18 and, by tightening of a machine bolt 22 extending through said plate and threaded into the end of the pivot pin 12, holds the bearing securely upon the pivot pin with the shaft sleeve 20 held firmly against a shoulder 12a of the pivot pin and the flange 15 of the outer shell member held firmly against the related ear A1.

The outer shell member 14, preferably, is fitted tightly within the bore 10 to be held against rotation relatively to the arm A, and the snubbing sleeve 16, including its flange 17, is preferably suitably bonded firmly to both the shell member 14 and the lining sleeve 18 so that all the three latter members are restrained against rotation.

The snubbing sleeve 16 is of rubber or rubber-like elastomer which is sufficiently soft to enable it momentarily to yield to shocks to which the bearing may be subjected either axially or laterally. At the inner end of its inner cylindrical surface and at the radially outer margin of the outer face of its flange 17, the snubbing member may advantageously be circumferentially grooved as at 23 and 24, respectively; the rubber ridges defining these grooves serving as sealing lips for excluding dirt and moisture from the bearing.

The lining sleeve member 18, as illustrated, is slidable circumferentially upon the shaft sleeve 20 and angularly upon the end plate 21 and, to facilitate such sliding, the member 18 is preferably of polytetrafluoroethylene, a plastic material well known for its low friction characteristic. This sleeve member is shown as extending axially outwardly from the location of the grooves 23 into engagement with the inner face of the end plate 21, thence, its flange 19, in contact with said face, extends radially outwardly to an over-all outside diameter approximately equal to the inside diameter of the cylindrical, main portion of the outer shell member 14. Thus, the member 18 is substantially coextensive with the areas where load or shock is imposed upon the bearing, both as thrust and/or laterally directed forces. The polytetrafluoroethylene may advantageously include some filler material.

The shaft sleeve 20 is fitted tightly and non-rotatatively upon the reduced end 11 of the pivot pin 12. The outer cylindrical surface of the shaft sleeve is preferably polished to enhance its sliding coaction with the lining sleeve member 18 as a rotary or rocking bearing and, with advantage, the inner face of the end plate 21 may also be polished to enhance its sliding coaction with the flange 19 of said lining sleeve member as a thrust bearing.

It will be recognized that, when the subject bearing assembly is employed in an automobile suspension, generally, as illustrated, the members 14, 16, and 18 rock with the arm A; the lining sleeve member 18 sliding on the shaft sleeve 20, and the flange 19 of said lining sleeve sliding on the inner face of the plate 21. The weight supported by the suspension assembly and shocks imposed laterally upon the bearing assembly are borne with some yielding or snubbing effect by the cylindrical portion of the snubbing sleeve 16 which extends within the cylindrical portion of the outer shell member 14. Thrusts or shocks imposed axially upon the bearing assembly are borne, with some yielding or snubbing effect, largely by the flange 17 of the snubbing sleeve of the bearing assembly at one or the other of the ends of the pivot pin 12, depending upon the direction of the imposed thrust or shock. Where a directional resolution of thrust and shock forces is encountered, said forces are borne both laterally and axially throughout the snubbing sleeve 16.

The modification, illustrated in FIG. 3, is directed to a general-purpose bearing assembly, more particularly an assembly wherein a relatively short pivot pin and a single rather than a double bearing is employed, extending along substantially the entire length of the pivot pin.

The bearing assembly shown in FIG. 3 is the same at both ends. It is adapted for use between a central element Cb and opposite side arm or ear elements Ab. The elements Cb and the pair of elements Ab may be rockable or fully rotatable in relation to each other.

The bearing comprises an annular outer shell member 14b having integral, radially outwardly extending flanges 15b at opposite ends thereof, an elastomer snubbing sleeve member 16b having integral, radially outwardly extending flanges 17b at opposite ends thereof, a lining sleeve member 18b having integral, radially outwardly extending flanges 19b at opposite ends thereof, and a shaft sleeve 20b.

Ignoring, for the purpose of this comment, the suffix letters used in the reference characters in FIG. 3; parts similarly numbered in FIGS. 2 and 3 are generally similar as to their functions and their materials. The bearing assembly of FIG. 3 differs from that of FIG. 2 chiefly in that the several members 14b, 16b, and 18b are flanged at opposite ends and in that, with grooves 24b provided upon the two flanges 17b, grooves located as those at 23 in FIG. 2 are omitted.

The bearing of FIG. 3 is mounted within opening 13b in an axially split bearing housing in the central element Cb and upon pivot pin 12b. It is secured between arms or ears Ab by machine screws 22b which extend through said arms and through end plates 21b and are threaded into opposite ends of the pivot pin.

Without attempting to envision all possible variations of this invention, it is to be noted that the shaft sleeve 20 or 20b may be omitted and the outer surface of the pivot pin portion 11 of FIG. 2 or the outer surface of pivot pin 12b of FIG. 3 may be polished as sliding surfaces.

Also, the lining sleeve 18 or 18b may be of suitable metal with a polished inner surface and, with such a change, the outer cylindrical surface of the pivot pin should preferably be impregnated with suitable low-friction material such as polytetrafluoroethylene or a shaft sleeve 20 or 20b of such low-friction material should be mounted fixedly upon the pivot pin.

It will also be understood that, within this invention, the main parts of the bearing assembly may be mounted upon a shaft or pivot pin and restrained against rotation relatively thereto, the arrangement being such as to provide for sliding of the assembly relatively to a surrounding element.

The terms "low-friction material" and "self-lubricating material" are employed herein as referring to various materials well known in the bearing art as materials which, in a sliding relationship, require little or no use of supplementary lubricant during their useful life.

The variations hereinbefore suggested should serve to indicate that this disclosed inventive concept may be practiced in various other ways and for use between other relatively turnable elements without, however, departing from the invention as set forth in the following claims.

We claim:

1. The combination of a shaft element, an outer element formed with a bore within which said shaft element is angularly slideable, and a snubber bearing assembly, said assembly comprising a rigid, cylindrical outer shell member, tightly fitted within said bore, a cylindrical snubbing sleeve member of elastomer material bonded within said shell member, a cylindrical lining sleeve member of self-lubricating, plastic, bearing material bonded within said snubbing sleeve member and adapted to slide rotationally upon said shaft element, a rigid end plate fixed upon an end of said shaft element in interfering relationship to the remainder of said assembly to limit axial shifting of said remainder on said shaft element in one direction, said shell member having at one end thereof a radially outwardly extending flange overlying said outer element, limiting axial shifting of said remainder on said shaft element in the opposite direction, said elastomer sleeve member having a radially outwardly extending end flange intimately overlying the mentioned flange of the shell member, said lining sleeve member having a radially outwardly extending end flange intimately overlying the mentioned flange of the elastomer sleeve member and bearing in low-friction, sliding engagement against said end plate, said flange of the lining sleeve member being of an outer diameter at least as great as the inside diameter of said shell member, the thrust forces to which the assembly is subjected being imposed upon said end plate at an annular area of the latter which is in engagement with said flange of the lining sleeve member whereby the latter flange provides low-friction, angular sliding action between the end plate and the remainder of the assembly, said elastomer sleeve being formed with sealing lips at the outer margin of its said flange and with sealing lips adjacent the elastomer sleeve's end opposite to its said flange, and said first-mentioned sealing lips overlying the radially outermost end portions of said lining sleeve member flange and being in sealing engagement with said rigid end plate.

2. The combination according to claim 1, said snubber bearing assembly further including a second rigid end plate fixed upon the opposite end of said shaft element; said shell member, elastomer sleeve member, and lining sleeve member each having second radially extending flanges, similar to the three first-mentioned radial flanges, and operative, similarly to said first-mentioned flanges, between said second end plate and said outer element; and said elastomer sleeve member being formed with such sealing lips at the outer margins of its two said flanges and similarly related to the end plates adjacent thereto and to surfaces of said outer element axially aligned therewith.

3. The combination of a shaft element, an outer element formed with a bore within which said shaft element is angularly slideable, and a snubber bearing assembly, said assembly comprising a rigid, cylindrical outer shell member, tightly fitted within said bore, a cylindrical snubbing sleeve member of elastomer material bonded within said shell member, a cylindrical lining sleeve member of low friction, plastic, bearing material bonded within said snubbing sleeve member and adapted to slide rotationally upon said shaft element, a rigid end plate fixed upon an end of said shaft element in interfering relationship to the remainder of said assembly to limit axial shifting of said remainder on said shaft element in one direction, said shell member having at one end thereof a radially outwardly extending flange overlying said outer element, limiting axial shifting of said remainder on said shaft element in the opposite direction, said elastomer sleeve member having a radially outwardly extending end flange intimately overlying the mentioned flange of the shell member, and said flange of the elastomer sleeve member having axially outwardly protruding, circular sealing lips in axial alignment with said flange of the shell member and in sealing engagement with said end plate whereby to exclude deleterious matter from the area of the assembly occupied by said lining sleeve member.

4. The combination according to claim 3, said snubber bearing assembly further including a second rigid end plate fixed upon the opposite end of said shaft element, said shell member and elastomer sleeve member each having second radially extending flanges, similar to the two first-mentioned radial flanges, and operative, similarly to said first-mentioned flanges, between said second end plate and said outer element; and said elastomer sleeve member being formed with such sealing lips at the outer margins of its two said flanges and similarly related to the end plates adjacent thereto and to surfaces of said outer element axially aligned therewith.

References Cited by the Examiner

UNITED STATES PATENTS

| | | | |
|---|---|---|---|
| 2,228,394 | 1/1941 | Marvin et al. | 308—72 |
| 2,238,197 | 4/1941 | Watson | 308—238 X |
| 2,827,303 | 3/1958 | Herbenar. | |
| 3,039,831 | 6/1962 | Thomas | 308—26 |
| 3,097,060 | 7/1963 | Sullivan | 308—26 X |
| 3,188,152 | 6/1965 | Miller | 308—238 X |

FOREIGN PATENTS

| | | |
|---|---|---|
| 974,920 | 6/1961 | Germany. |
| 656,943 | 9/1951 | Great Britain. |

MARTIN P. SCHWADRON, *Primary Examiner.*

DAVID J. WILLIAMOWSKY, *Examiner.*

R. F. HESS, *Assistant Examiner.*